United States Patent [19]

Ishida et al.

[11] 4,344,680
[45] Aug. 17, 1982

[54] PHOTOGRAPHIC DEVICES FOR CONTROLLING FLASH PHOTOGRAPHY

[75] Inventors: Tokuji Ishida, Daito; Nobuyuki Taniguchi; Masatoshi Itoh, both of Sakai; Toshiaki Matsumoto, Izumisano; Tatsuro Izumi; Masatake Niwa, both of Sakai, all of Japan

[73] Assignee: Minolta Camera Kabushiki Kaisha, Osaka, Japan

[21] Appl. No.: 249,404

[22] Filed: Mar. 31, 1981

[30] Foreign Application Priority Data

Apr. 9, 1980 [JP] Japan .................................. 55-47240

[51] Int. Cl.³ ....................... G03B 15/05; H05B 41/34
[52] U.S. Cl. .................................. 354/33; 354/60 F; 354/127; 315/241 P; 315/151; 315/158
[58] Field of Search ............................ 354/27, 32–35, 354/60 F, 126–128, 137, 138, 139, 145, 149, 141; 315/241 P, 151, 156–159

[56] References Cited

U.S. PATENT DOCUMENTS 4,241,279 12/1980 Numata ............................. 354/33 X
4,285,585 8/1981 Numata ................................. 354/33

FOREIGN PATENT DOCUMENTS 2539897 3/1976 Fed. Rep. of Germany .
50-40131 4/1975 Japan .

Primary Examiner—L. T. Hix
Assistant Examiner—William B. Perkey
Attorney, Agent, or Firm—Watson, Cole, Grindle & Watson

[57] ABSTRACT

In a photographic system for flash photography, the firing current of an electronic flash tube is selectively restricted in accordance with the detection of whether or not the flash light amount necessary for a flash photograph is below a predetermined level prior to the firing of the flash tube for a photographic exposure. A selection is made between a first mode of flash firing with flash tube current flowing through a switching element and a second mode of flash firing with a flash tube current flowing through an impedance device serially connected with the flash tube. Alternatively, a selection can be made between higher or lower voltage levels to which the main flash firing capacitor is charged. The amount of light required from a flash device can be preparatorily identified and when less than a predetermined light output the flash device is caused to select the second mode of flash firing, or alternatively to select the lower level of the voltage charged by the main capacitor. The operation of the flash tube is controlled such that the flash light emission therefrom substantially corresponds to the necessary flash light amount such that a reduction is obtained in the ratio of excessive amount of flash light to the necessary amount of flash light.

23 Claims, 9 Drawing Figures

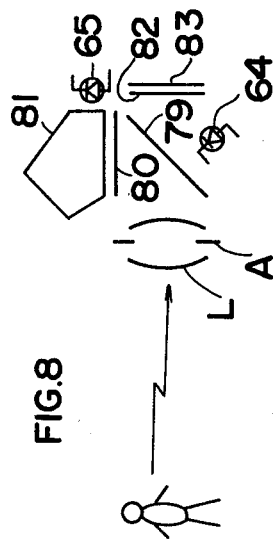
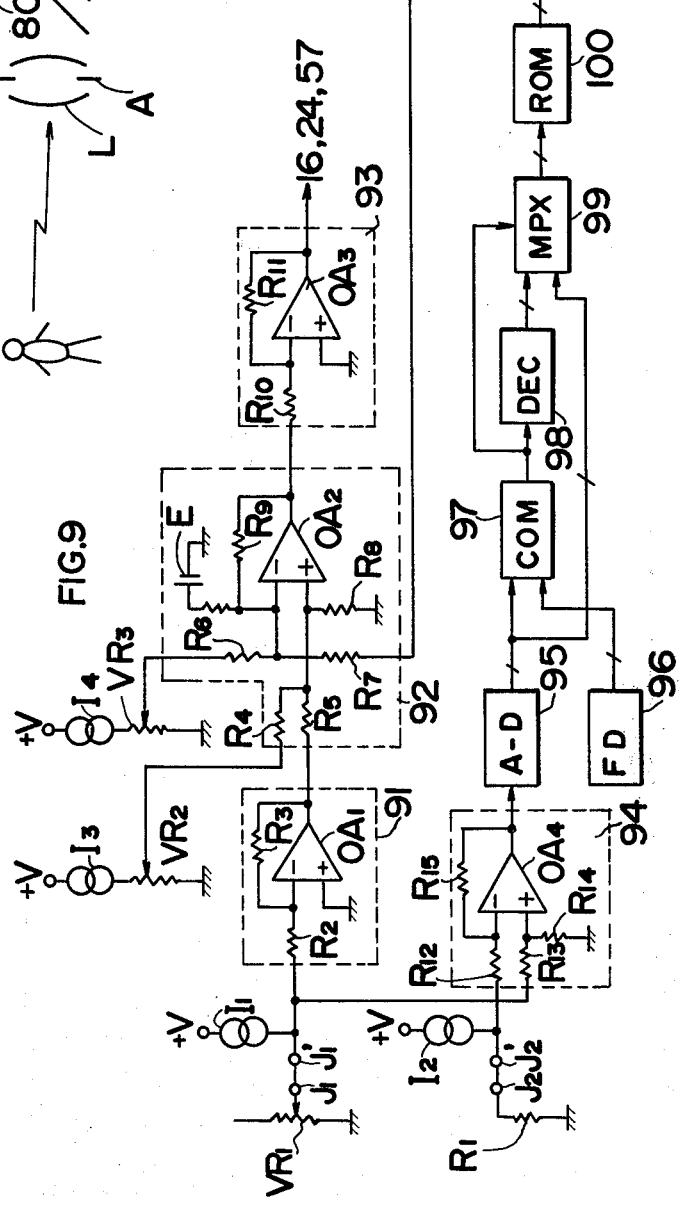

PHOTOGRAPHIC DEVICES FOR CONTROLLING FLASH PHOTOGRAPHY

BACKGROUND OF THE INVENTION

1. Field of the Invention

The present invention relates to camera photographic systems for flash photography, and particularly to devices capable of controlling the amount of light emitted by electronic flash firing in such photographic systems.

2. Description of the Prior Art

Prior art electronic flash devices in flash photographic systems of the controllable flash light output type change the flash duration to control the amount of flash light, but the operating mode of the flash tube remains unchanged. In such cases, however, a controlled decrease in the light output inevitably results in excessive light output. Thus, this type of prior art electronic flash device poses a problem of control when a small amount of flash light is required for certain photographic modes, such as closeup photography.

Prior art electronic flash devices of the controllable light output type are generally constructed as shown in FIG. 1. DC-DC converter 1 boosts the voltage of power cell 2, and the output of DC-DC converter 1 is rectified by diode 4 to charge main capacitor 5. A trigger circuit (not shown) triggers flash tube 7, and at the same time, turns thyristor 6 on, whereby flash tube 7 emits flash light having a waveform shown by curve l in FIG. 2. When switch S1 is turned on at point t1 of the flash duration, the potential at node A becomes zero. As, however, commutation capacitor C is charged with a positive voltage, the potential at node A being zero causes the potential at node B to decrease to a negative voltage, which in turn makes the anode of thyristor 6 at a negative potential, whereby thyristor 6 is cut off to stop the flash firing of flash tube 7. However, the flash firing does not stop immediately, as node B remains at a negative potential because of capacitor C, and as the discharge current of flash tube 7 flows into capacitor C, the voltage at node B increases, whereby flash tube 7 continues to be discharged for flash firing until the voltage across both terminals of flash tube 7 reaches a level at which the discharge can continue no longer. The spike-like waveform of flash light from points t1 to t2 above the dotted line in FIG. 2 is for flash light that continues after point t1, and is called the excessive amount of light, as described above. The excessive amount of light exists even when switch S1 is closed at point t3 in FIG. 2. In this case, however, the ratio of the excessive light output to the necessary light output is small. However, in the case where a small amount of light is required for closeup photography or the like, the ratio of an excessive amount of flash light to a desired amount of flash light becomes large, resulting in a considerable deleterious effect that is not ignorable when a small amount of flash light is required.

SUMMARY OF THE INVENTION

A primary object of the present invention is to provide an electronically controlled device for preventing the emission of an excessive amount of light from a camera flash light apparatus.

Another object of the invention is to provide such flash control devices of the types described herein for reducing or eliminating excessive amounts of flash light in flash photography, requiring relatively small amounts of light, and in particular in closeup photography.

A further object of the invention involves the provision of different flash light modes of operation which are automatically selected to reduce or eliminate the excessive amount of flash light output from a camera flash system.

As explained above, the problem of excessive amount of flash light is serious in photographic conditions which may require only a small amount of flash light. One of the features incorporated into the present invention comprises a selection between a first mode of flash firing with flash tube current flowing simply through a switching element, and a second mode of flash firing with a flash tube current flowing through an impedance device connected in series with the flash tube. An alternative feature of the present invention comprises a selection between higher or lower voltage levels to be charged by a main flash-firing capacitor. Furthermore, the amount of light required from a flash device can be preparatorily identified by the camera, and when it is less than a predetermined light output, a signal is transmitted from the camera to the flash device to select the second mode of flash firing or, alternatively to select the lower level of the voltage charged by the main capacitor. Either one of the aforementioned alternative techniques causes a decrease in the intensity of flash light when a small amount of flash light is required, resulting in a longer flash duration for an identical amount of required flash light, whereby it is possible to reduce the ratio of excessive amount of flash light to the necessary amount of flash light.

BRIEF DESCRIPTION OF THE DRAWINGS

The above, as well as other, objects, advantages and features of the invention are readily apparent from the following description of preferred embodiments of the invention setting forth the best mode of carrying out the invention when taken in conjunction with the accompanying drawings wherein:

FIG. 8 is a diagram illustrating the layout of light receiving elements in the embodiment of FIG. 7; and FIG. 9 is a block diagram of circuitry for generating a signal indicative of the amount of flash light required for a flash photograph.

DETAILED DESCRIPTION OF THE PREFERRED EMBODIMENTS

Throughout the description, the expressions HIGH and LOW are used to denote logic level signals. The DC—DC converter for charging the main capacitor in the various embodiments of the invention is a known component. The DC—DC converter circuit is, however, illustrated in FIG. 5. Furthermore, in all the various embodiments described herein, similar or like components and circuits have been identically identified. Additionally, throughout the specification, various switches are illustrated and described as mechanical switches in which a movable switch contact is either opened or closed. Such switch structure and functions can also be performed by electronic switches, such as for example, semiconductor switches.

Figure 1:
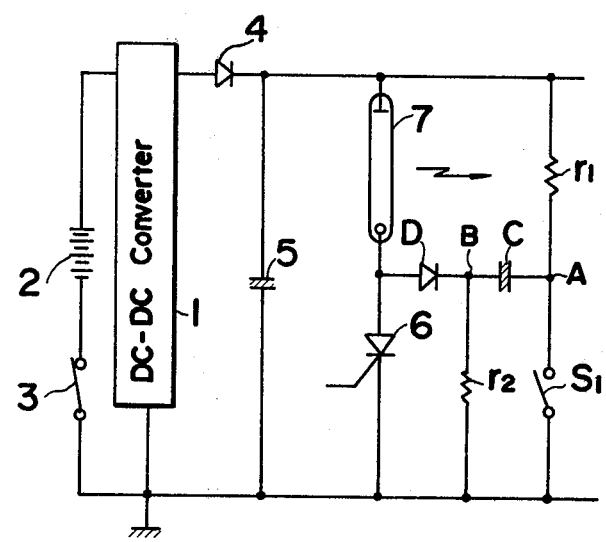
FIG. 1 is a circuit diagram of a relevant portion of a prior art electronic flash device.
Figure 2:
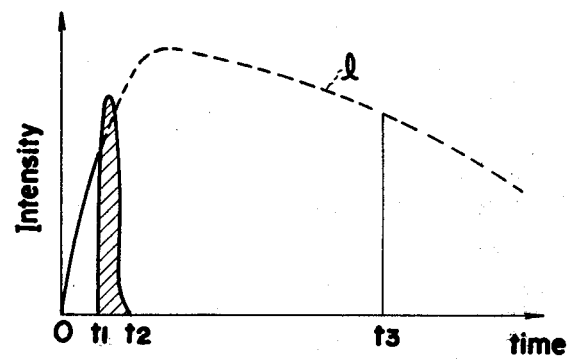
FIG. 2 is a graph of a normal flash light waveform illustrating the disadvantages of the prior art electronic flash device.
Figure 3:
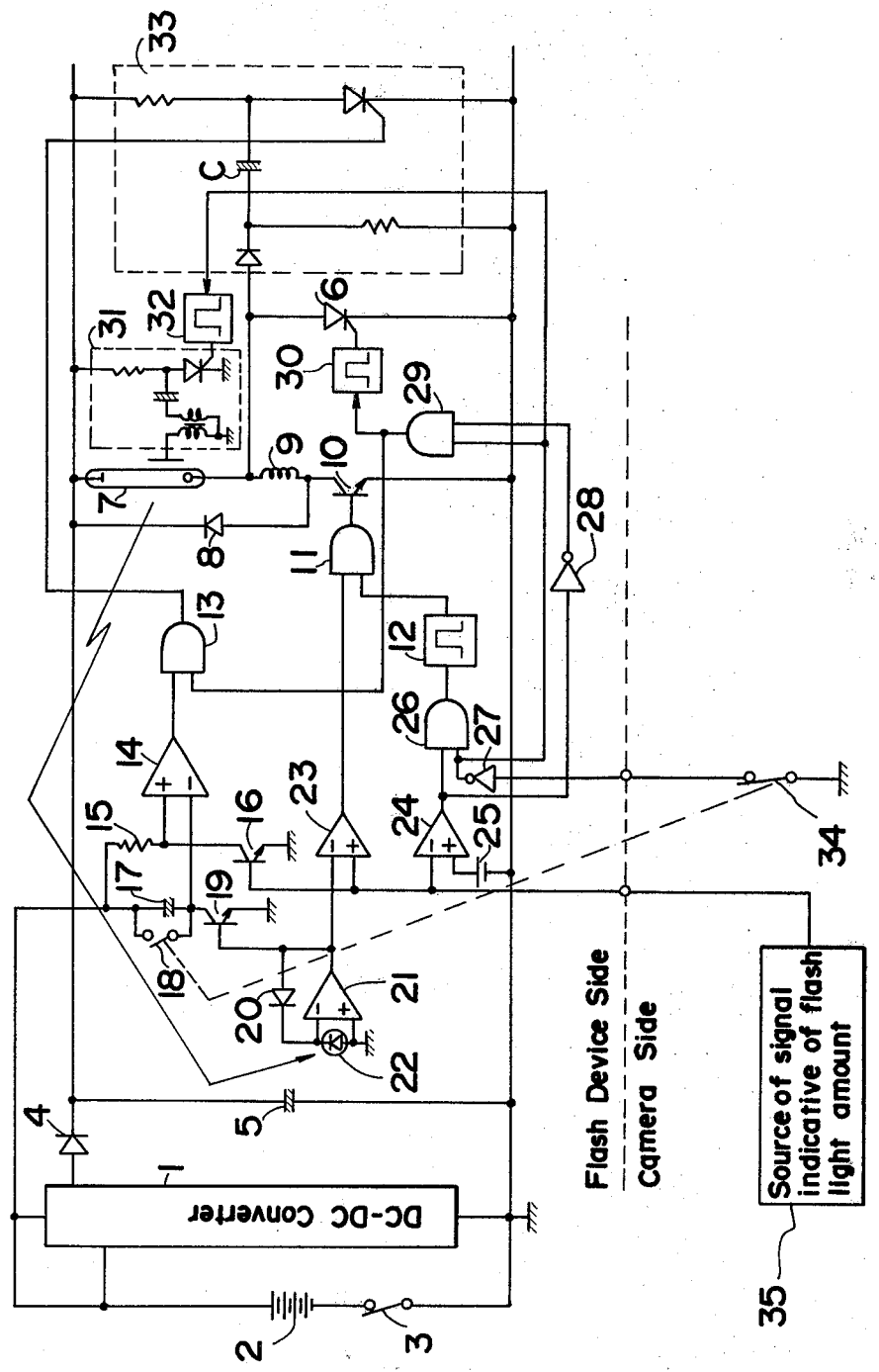
FIG. 3 illustrates a first embodiment of a flash control device in accordance with the present invention.

With reference to FIG. 3, which shows a first embodiment of a flash control device in accordance with the present invention, two circuits are provided for the current flow through flash tube 7 (throughout the specification, reference to a flash tube means a Xenon tube or other equivalent flash element). One current circuit includes thyristor 6 alone as a switching element, and the other current circuit includes inductance element 9 and transistor 10 connected in series as a switching element. These two circuits are respectively selected by turning on either thyristor 6 or transistor 10. A signal generated when synchro contact 34 (X contact) of the camera is closed, is gated through AND gates 26 and 29 to transistor 10 and thyristor 6, respectively, to turn them on. The gating of either AND gate 26 or 29 is determined depending on whether the output of flash light signal source 35, located for example in the camera, is larger or smaller than the voltage of reference source 25 after comparison by comparator 24. Flash light signal source 35 determines the amount of flash light required for a flash photograph, and the structure, function and operation of that device is set forth herein with respect to the embodiment of FIG. 9. When the amount of required flash light as determined by flash light signal source 35 is less than that provided by reference source 25, AND gate 26 is opened, allowing the closure of X contact 34 to turn on transistor 10, whereby the current of flash tube 7 flows through inductance element 9 to control the amount of light output. As described later, in this case flash tube 7 forms a kind of relaxation oscillator with inductance element 9, resulting in flash tube firing with a constant intensity for a predetermined period of time corresponding to the output pulse duration of one shot circuit 12. The amplitude of the durable constant intensity is determined in dependence upon the output level of flash light signal source 35, the circuitry of which is preferably located in the camera and to be described hereinafter with respect to the embodiment of FIG. 9. The amount of exposure is controlled in this embodiment by controlling flash tube firing to provide a constant durable amplitude of flash output for a predetermined period of time as is evident from the following description.

With further reference to the embodiment of FIG. 3, photodiode 22 is disposed near flash tube 7 to directly receive and monitor flash light emitted therefrom. The output of photodiode 22 is logarithmically converted by operational amplifier 21 and diode 20 into a monitor signal. The monitor signal generated from operational amplifier 21 is integrated by capacitor 17 and transistor 19 when switch 18 is opened in synchronization with the closing of X contact 34 of the camera, and the integrated signal is input to the negative input terminal of comparator 14. The output of flash light signal source 35 is logarithmically expanded by resistor 15 and transistor 16, and a voltage corresponding thereto is input to the positive input terminal of comparator 14. A relaxation type oscillation, to be described later, is performed by a circuit comprising flash tube 7, inductance element 9, diode 8, transistor 10, AND gate 11, one shot circuit 12, photodiode 22, operational amplifier 21, diode 20 and flash light signal source 35, the output of which controls the durable intensity flash light control circuitry described more fully hereinafter. Comparator 23 receives the output of operational amplifier 21, representing the output from the previously described flash monitor circuit for the flash output of flash tube 7, as well as the output of flash light signal source 35, so that flash firing is possible with a durable intensity, the amount of which is determined by the output of signal source 35. The period of duration of flash light is determined by the duration of a pluse generated from one shot circuit 12, and the flash duration is normally set to about a few msec.

The operation of the durable intensity flash light control circuit is initiated by a HIGH level, the output of one shot circuit 12 and a HIGH level output of comparator 23, such that the output of AND gate 11 switches to a HIGH level. This makes transistor 10 conductive. Because flash tube 7 has been triggered for flash firing, the conduction of transistor 10 causes the charge of main capacitor 5 to begin flowing through inductance element 9, transistor 10 and flash tube 7, the current flow being controlled by inductance element 9, such that the light intensity output of flash tube 7 gradually increases. The light intensity of flash tube 7 is monitored by photodiode 22, diode 20 and operational amplifier 21. Comparator 23 receives the output of operational amplifier 21 and the output of flash light signal source 35, i.e., a voltage corresponding to a desired durable flash light intensity. When the intensity of the flash light increases to a value which is determined by the output of flash light signal source 35, the output of comparator 23 is inverted from a HIGH to a LOW level, and the output of AND gate 11 is also inverted to a LOW level, whereby transistor 10 is cut off. Then, the current corresponding to the energy stored in inductance element 9 flows through diode 8 into the flash tube 7. The combined effect of the current through diode 8 and the delay phenomenon of flash tube 7 in converting the electrical energy into light energy causes the flash light intensity to initially increase, and then begin to decrease. As a result of the decrease of the flash light intensity below the value determined by flash light signal source 35, the output of comparator 23 is inverted again to a HIGH level, allowing transistor 10 to again be conductive, and after a slight delay, the flash light intensity increases again. The above-described operation is cyclically repeated until the output of one shot circuit 12 is inverted to a LOW level. Thus, flash firing is performed with a macroscopically durable intensity determined by the output of flash light signal source 35 with a relatively microscopic fluctuation in intensity corresponding to the above-described cycle operation at an operating frequency set to about 10 KHz. The flash firing may be described as a durable constant intensity since the fluctuation is sufficiently fast as compared with the time required for ordinary photography. With respect to this type of flash firing, it is recomendable to refer to U.S. Pat. No. 4,275,335. The output of reference source 25, corresponding to a predetermined amount of flash light, is input to the positive input terminal of comparator 24, the negative input terminal of which receives the output of flash light signal source 35. It should be noted that flash light signal source 35 determines the required amount of flash light for a number of photographic conditions such as, for example, film speed, object distance, focal length of the objective lens, effective F-number, etc., as more fully described hereinafter.

The following is a description of the operation of the flash light control circuit of FIG. 3. Closing power switch 3 charges main capacitor 5 to a high voltage. When the output of flash light signal source 35 is greater than a predetermined light amount represented by reference source 25, the output voltage of comparator 24 inverts to a LOW level, and the output of inverter 28 inverts to a HIGH level. With X contact 34 closed, the output of inverter 27 inverts to a HIGH level, and the output of one shot circuit 32 switches to a HIGH level and remains HIGH for a specific period of time, whereby flash tube trigger circuit 31 functions to trigger flash tube 7 for flash firing. Similarly, with X contact 34 closed, the output of AND gate 29 switches to a HIGH level and the output of one shot circuit 30 becomes HIGH and remains HIGH for a specific period of time, thereby turning thyristor 6 on. As a result, the charge stored in main capacitor 5 starts to be discharged through thyristor 6 and flash tube 7 for the initiation of flash firing. In synchronization with the start of flash firing as determined by the closing of X contact 34, switch 18 is opened, and the monitored amount of flash light starts to be integrated. When the integral value reaches a predetermined value as set by flash light signal source 35, the output of comparator 14 is inverted to a HIGH level. Since the output of AND circuit 29 had been HIGH, the inversion of comparator 14 causes the output of AND circuit 13 to be HIGH, whereby flash stop circuit 33 functions to cut off thyristor 6 and flash firing is stopped.

In this case, the necessary flash light amount corresponding to the signal from source 35 is so large in the sense that the ratio of the excessive amount of light to the necessary amount of light is so small that the excessive amount is negligible. Thus, flash firing with a correct amount of flash light is possible.

When the flash light amount generated by source 35 is smaller than the predetermined amount of flash light as predetermined by reference source 25, the output of comparator 24 becomes HIGH. With X contact 34 closed, flash tube 7 is actuated for flash firing. The output of AND gate 29 remains LOW at this time, causing thyristor 6 to be in a cut-off condition. However, the output of AND gate 26 becomes HIGH, and the output of one-shot circuit 12 becomes HIGH and remains so for a specific period of time, during which electronic flash firing with a constant durable intensity is obtained. Additionally, the value of the constant intensity is determined in accordance with the signal from flash light signal source 35, as described earlier, whereby the amount of light emitted by flash tube 7 is also controlled to that value corresponding to the signal from flash light signal source 35. At this time, the intensity of flash light is very low as compared to that when thyristor 6 is turned on for flash firing, and therefore the excessive amount of flash light itself is very small and the ratio of the excessive amount to the necessary amount is also small due to the relatively elongated flash duration time.

Figure 4:
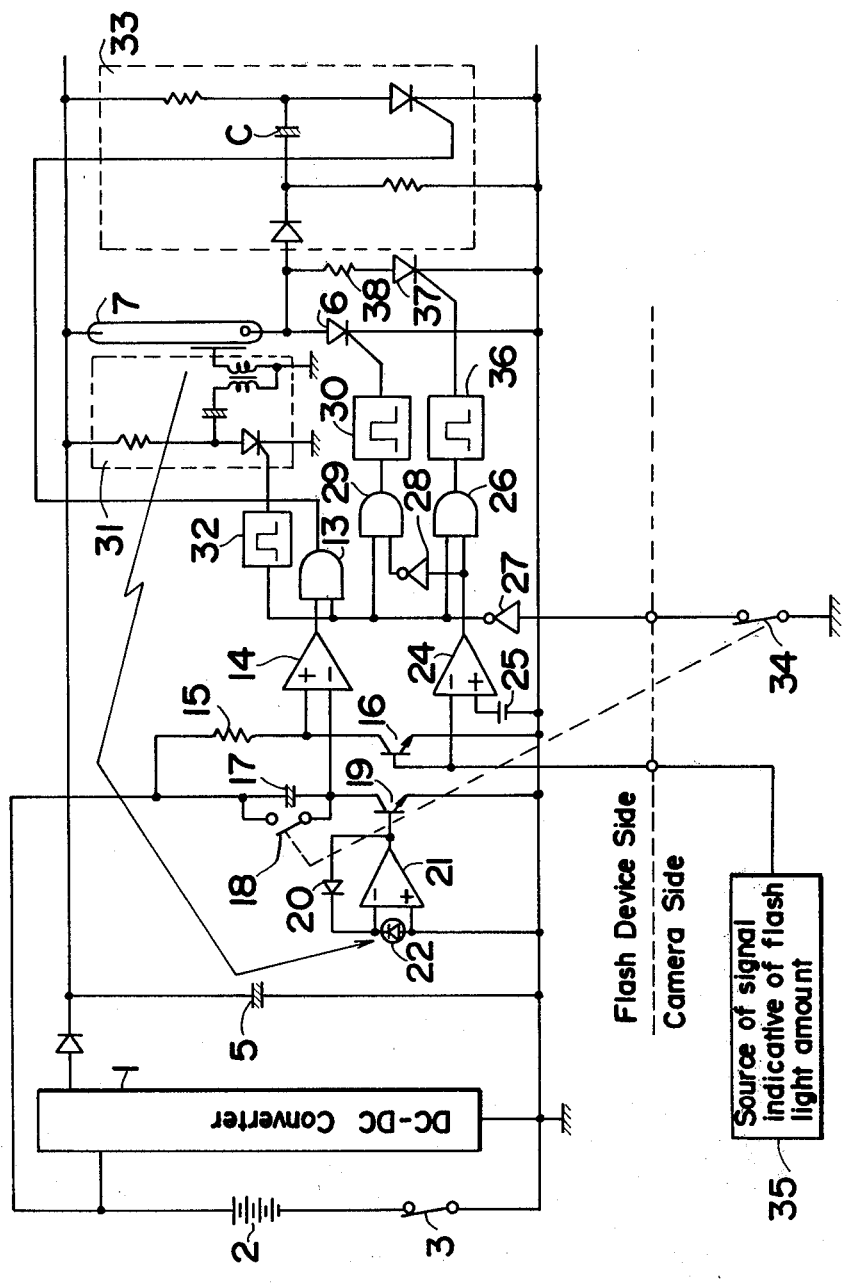
FIG. 4 illustrates a second embodiment of a flash control device in accordance with the present invention.

FIG. 4 is a circuit diagram of an electronic flash device illustrating a second embodiment of the present invention in which the components corresponding to the embodiment of FIG. 3 have been identically identified. In this embodiment, the current paths for current from flash tube 7 include a circuit comprising thyristor 6 alone, and a circuit comprising serially connected resistor 38 and thyristor 37 as impedance elements. Similar to the first embodiment of FIG. 3, two current path circuits are alternatively selected by AND gates 26 and 29, the opening and closure of which are controlled by the output level of flash light signal source 35. In the embodiment of FIG. 4, when the amount of flash light as indicated by flash light signal source 35 is smaller than a predetermined amount of flash light provided by reference source 25, flash tube 7 is discharged through resistor 38 and thyristor 37, and the flash light intensity waveform is similar to that of a waveform obtained from an ordinary discharge through thyristor 6, except that the light intensity is lowered as a whole. Also, the amount of light is controlled by the output of flash light signal source 35 in accordance with the flash duration control circuitry as in the case of ordinary flash photography.

The following description pertains to the construction and operation of the embodiment of FIG. 4. When power switch 3 is closed, main capacitor 5 is charged to a high voltage. When the signal light amount from flash light signal source 35 is higher than that predetermined level established by reference source 25, the output of comparator 24 is LOW. With X contact 34 closed, flash tube trigger circuit 31 functions to trigger flash firing as in the embodiment of FIG. 3. At the same time, thyristor 6 is gated on to start the flash firing of flash tube 7. One-shot circuit 30 provides a pulse to the gate of thyristor 6 as AND gate 29 is unblocked as both inputs thereof are at a HIGH level. The closing of X contact 34 causes the inverter output of inverter 27 to be HIGH and the LOW output of comparator 24 is inverted to a HIGH output by inverter 28. Subsequently, when the integrated value of flash light across capacitor 17 reaches that value predetermined by flash light signal source 35, transistor 16 is made conductive and comparator 14 inverts its output. The two inputs to AND gate 13 are HIGH such that flash stop circuit 33 functions to stop flash firing.

In the case where the flash light amount from flash light signal source 35 is lower than the predetermined light amount provided by reference source 25, the output of comparator 24 becomes HIGH. Thus, even with X contact 34 closed, thyristor 6 remains in a cut-off condition, since the output of inverter 28 is LOW and AND gate 29 is blocked. However, AND gate 26 is unblocked and the output thereof becomes HIGH, such that the output of one-shot circuit 36 becomes HIGH for a specific period of time, causing thyristor 37 to be gated on, whereby the charge stored in main capacitor 5 is discharged through resistor 38, thyristor 37 and flash tube 7 so that flash firing is started. Next, when the value of flash light, received by photodiode 22 and integrated by capacitor 17 with transistor 19 on, reaches a predetermined value, the output comparator is inverted and flash stop circuit 33 functions to stop flash firing. The light intensity at this time is lower than that of flash light emitted when thyristor 6 is turned on because the current flow to flash tube 7 is reduced by resistor 38. As a result, the flash tube current is so small that any excessive amount of flash light itself is small, and the ratio of it to the necessary amount of flash light is also small, whereby an accurately controllable range for a small amount of flash light is greatly extended.

Figure 5:
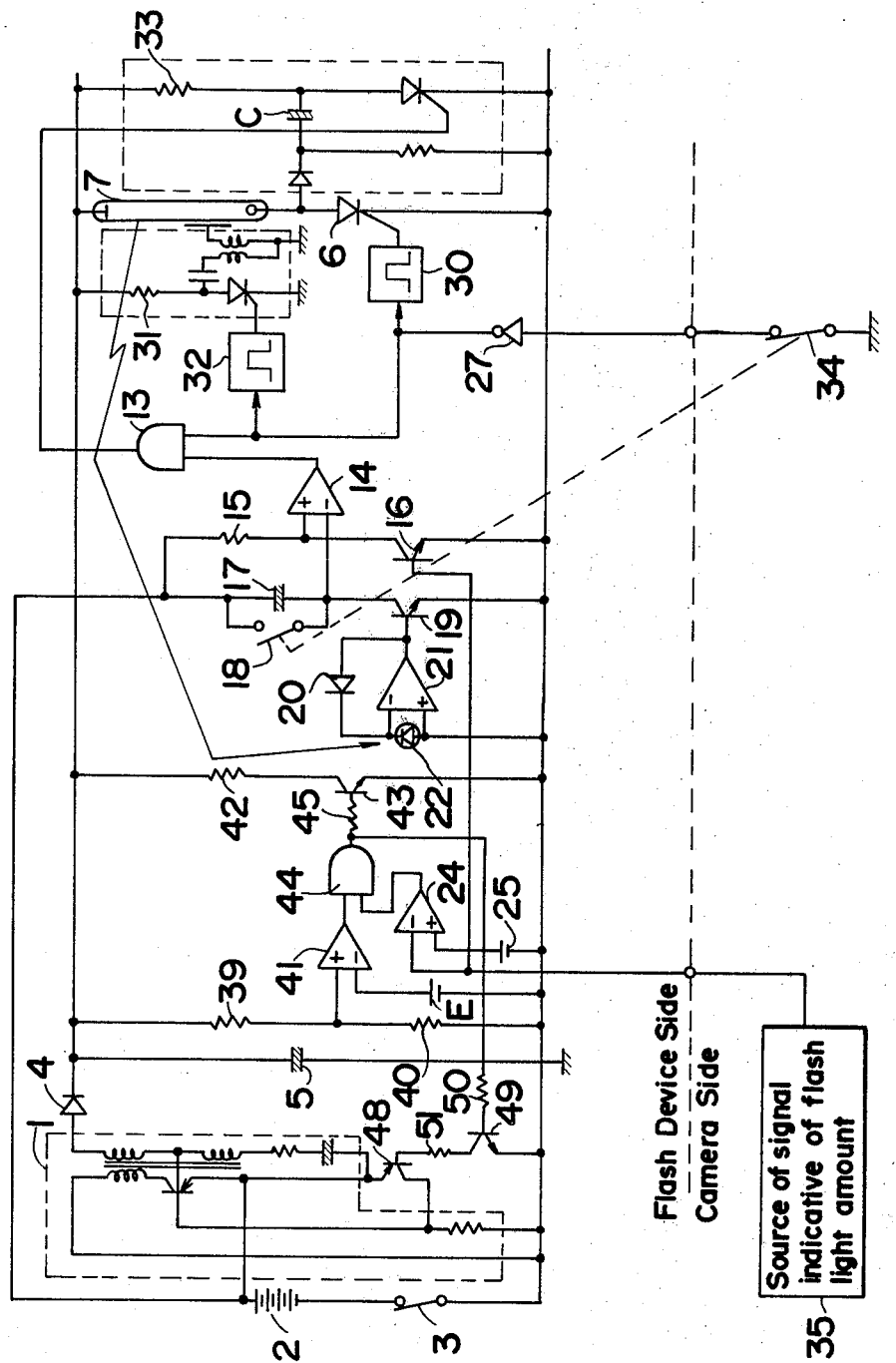
FIG. 5 illustrates a third embodiment of a flash control device in accordance with the present invention.

FIG. 5 is a circuit diagram of the third embodiment of the present invention in which components corresponding to those previously described with respect to the embodiments of FIGS. 3 and 4 are identically identified. FIG. 5 includes an illustration of the circuitry of DC-DC converter 1 which is known to those skilled in the art to which the invention pertains. Resistors 39, 40 and comparator 41 together constitute a circuit which detects whether or not the voltage across main capacitor 5 is higher than reference voltage E. When a signal indicative of the flash light amount generated by flash light signal source 35 is lower than that predetermined level of reference source 25, the output of comparator 24 becomes HIGH, and the output of AND gate 44 becomes HIGH until the charged voltage of main capacitor 5 becomes lower than reference voltage E, causing the charge stored in main capacitor 5 to be discharged through resistor 42 and transistor 43. Furthermore, since transistors 48 and 49 are turned on, DC-DC converter 1 stops boosting the voltage of power supply battery 2 so that main capacitor 5 is not charged. If the voltage across main capacitor 5 is lower than that of reference voltage E, transistors 43, 48 and 49 are turned off to charge capacitor 5. When X contact 34 is closed, with the voltage across main capacitor 5 maintained equal to that of reference voltage E by means of repetitions of the above operation, flash tube 7 starts flash firing and when the integrated value of flash light (as determined by capacitor 17) reaches a predetermined value, comparator 14 inverts its output and flash stop circuit 33 is actuated to stop flash firing as has been described with respect to the embodiments of FIGS. 3 and 4. Since the voltage charged by main capacitor 5 remains as low as reference voltage E, the current flowing through flash tube 7 is reduced, such that an excessive amount of flash light that is produced is negligible. Therefore, an accurately controllable range for a small amount of flash light is greatly extended.

When a signal indicative of the amount of flash light generated by flash light signal source 35 is higher than the predetermined level of reference source 25, the output of comparator 24 becomes LOW, causing transistor 43 to remain non-conductive, whereby the voltage across main capacitor 5 remains at a high voltage. Next, when X contact 34 is closed, flash tube 7 starts flash firing, and when the integrated value of flash light reaches a specific value, comparator 14 inverts its output and flash tube 7 stops flash firing as previously described with respect to the embodiments of FIGS. 3 and 4. The remaining components and circuits also operate as previously described.

Figure 6:
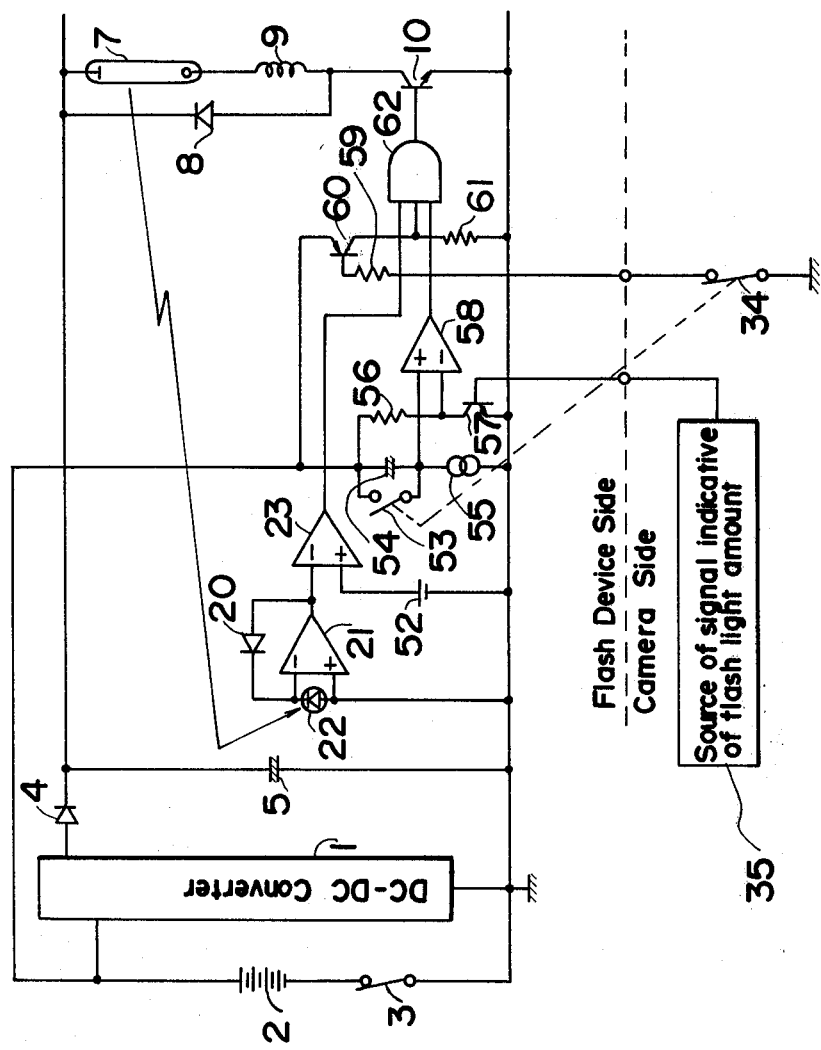
FIG. 6 illustrates a modification of the FIG. 3 embodiment of the present invention.

FIG. 6 is a partial circuit diagram of an electronic flash device illustrating a fourth embodiment of the present invention. In response to a signal output from flash light signal source 35, the circuitry shown in FIG. 6 controls the duration during which the flash light is output with a predetermined durable intensity, in contrast to the case of the first embodiment in FIG. 3 in which the flash light is output during a predetermined period of time with the intensity maintained at a value controlled by flash light signal source 35.

With continuing reference to FIG. 6, resistor 56, transistor 57, capacitor 54, switch 53, constant current source 55, comparator 58, AND gate 62, transistor 60, resistors 59 and 61 together constitute a one shot circuit, the flash duration of which is varied by a signal from flash light signal source 35. With X contact 34 closed, switch 53 is open in synchronization therewith, whereby the output of comparator 58 is inverted from a HIGH to LOW level with a delay corresponding to a signal indicative of the flash light amount from flash light signal source 35. Additionally, the collector potential of transistor 60 becomes HIGH in synchronization with X contact 34 being closed, whereby a one shot pulse is gated by AND gate 62 with a duration corresponding to the signal from flash light signal source 35. As a result, when X contact 34 is closed, flash light with a durable intensity predetermined by constant voltage source 52 is emitted for a period of time determined by the output of flash light signal source 35, which signal is indicative of the flash light amount.

Figure 7:
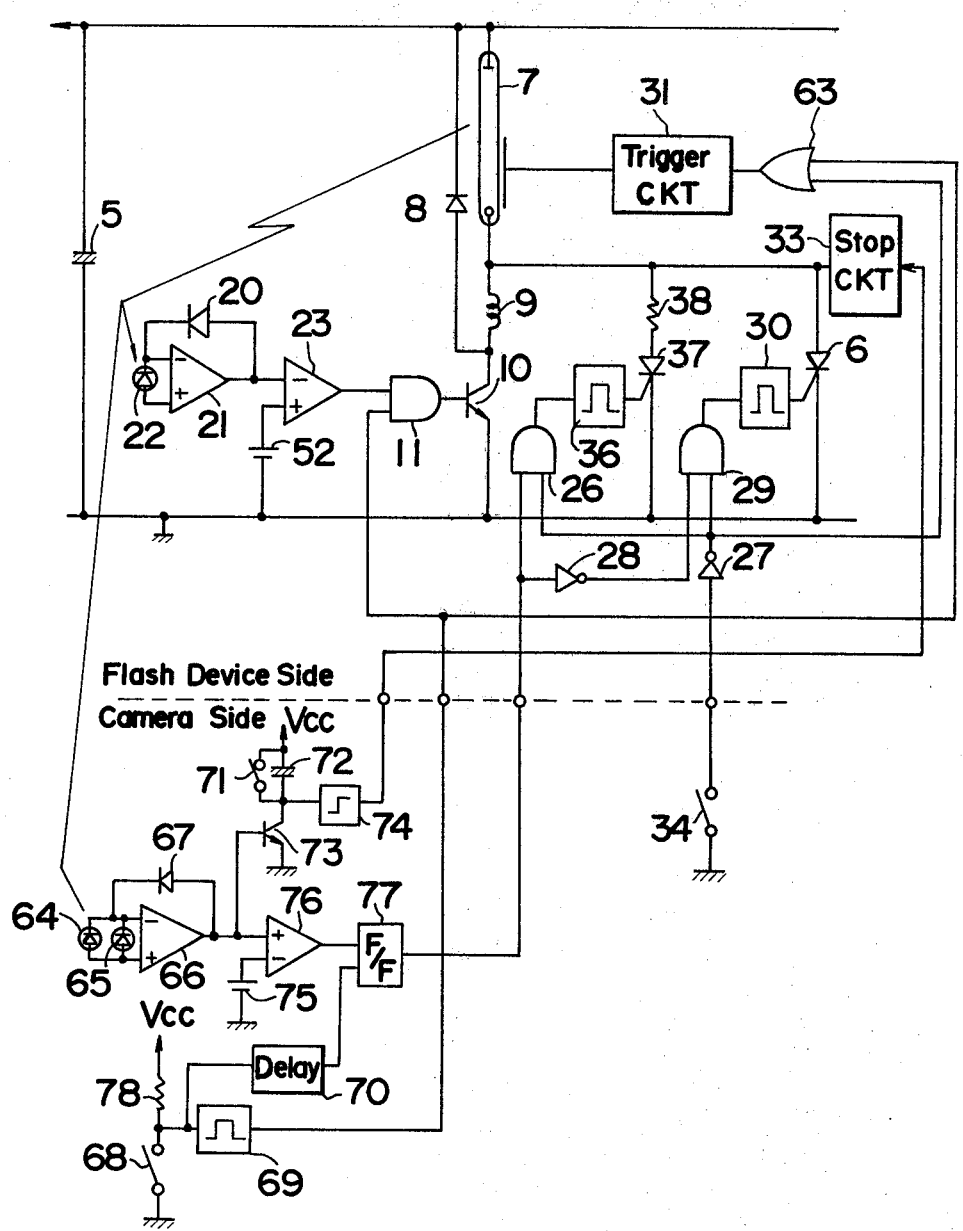
FIG. 7 illustrates another embodiment of the present invention in which preparatory flash light is provided to determine the amount of flash light required for flash photography.

FIG. 7 illustrates another embodiment of the present invention which is designed to preparatorily illuminate an object with flash light emitted from flash tube 7 with a predetermined durable low intensity and to estimate the amount of flash light required for photography by measuring the light reflected from the object, thereby determining which of two flash modes is selected. A flash light with a predetermined durable low intensity is emitted by a circuit comprising inductance element 9, transistor 10, photodiode 22, comparator 23 and flash tube 7 in the same operable manner as the light emission with a durable intensity as shown and described with respect to the embodiments of FIG. 3. The two current paths for flash tube 7 selected according to the level of the required flash light amount correspond to the use of either a circuit consisting of thyristor 6 alone, or a circuit comprising resistor 38 and thyristor 37 connected in series therewith, as previously described in the above embodiments. FIG. 7 shows the location of circuitry for an electronic flash device and a camera above and below the dotted line, respectively.

Photodiode 64 is disposed near the film plane to receive the light reflected therefrom after the mirror in a single lens reflex camera has been moved to the picture taking position. Photodiode element 65 is disposed near a pentagonal prism to receive scene light before the above-mentioned mirror movement. Photodiodes 64 and 65, diode 67 and operational amplifier 66 constitute a light measuring circuit for measuring the scene light. Switch 68 is opened in response to the depression of a shutter release button (not shown) and is connected to the input terminal of one shot circuit 69. One shot circuit 69 is triggered when switch 68 is closed, thereby generating a pulse which becomes HIGH for a specific period of time. Capacitor 72 and transistor 73 constitute an integrating circuit for the measured value of the scene light, and that integrating circuit starts the integration of the measured light value when switch 71 is opened in response to the start of the leading shutter curtain travel. When the integrated light value reaches a specific value, the output of switching circuit 74 is inverted from LOW to HIGH.

The following is a description of the operation of the circuitry of the FIG. 7 embodiment. Switch 68 is closed upon depression of the camera shutter release button (not shown), and the output of one shot circuit 69 becomes HIGH for a specific period of time. This HIGH signal inverts the output of OR gate 63 in the flash device to a HIGH level, whereby flash tube trigger circuit 31 functions to actuate flash tube 7 for preparatory flash firing. In response thereto, an electronic flash circuit with a durable intensity output, comprising flash tube 7, diode 8, inductance element 9, transistor 10, AND gate 11, comparator 23, reference voltage source 52, photodiode 22, operational amplifier 21 and diode 20, is actuated for preparatory flash firing with a predetermined constant durable intensity during a period of time determined by one shot circuit 69. At this time, since the mirror in the camera has not moved into picture taking position, the value of scene light during flash light emission with a durable intensity is received by photodiode 65, and an output corresponding thereto is generated from operational amplifier 66. Because the flash firing of flash tube 7 is performed with a durable constant intensity predetermined by the flash control device, the output of operational amplifier 66, i.e., the light-measured value, depends upon a camera-to-object distance such that it decreases as the camera-to-object distance increases. Reference voltage source 75 provides a predetermined voltage corresponding to the output of operational amplifier 66 for flash firing with a predetermined durable intensity with an object located at a predetermined distance. The output of voltage source 75 is input to comparator 76 together with the output of operational amplifier 66. When the camera-to-object distance is closer than the predetermined corresponding distance set by voltage source 75, the output of comparator 76 becomes HIGH. Further, the output of delay circuit 70 is inverted to a HIGH level with a delay of a predetermined period of time which is shorter than the duration of a pulse generated by one shot circuit 69, when switch 68 is opened. Flip-flop 77 stores the output of comparator 76 in synchronization with the inversion of the output of delay circuit 70 from a LOW to HIGH level. That is to say, the output of flip-flop 77 becomes HIGH.

Next, when the leading shutter curtain of the camera starts travelling, switch 71 is opened, and the integration of the light-measured value begins. When X contact 34 is closed, the output of inverter 27 becomes HIGH, and the output of OR gate 63 becomes a HIGH level again, whereby flash tube trigger circuit 31 actuates flash tube 7 for flash firing. Similarly, the output of AND gate 26 becomes HIGH, and the output of one shot circuit 36 also becomes HIGH, causing thyristor 37 to be turned on, whereby the charge stored in main capacitor 5 is discharged through resistor 38 and thyristor 37 to fire flash tube 7. When the flash light received by photodiode 65 reaches a predetermined value, the output of switching circuit 74 is inverted to a HIGH level, and the output signal thereof is input to flash stop circuit 33, whereby flash firing is stopped. At this time, the current flowing through flash tube 7 is suppressed by resistor 38 to a low level, causing the effect of an excessive amount of light from the stop of flash firing to be remarkably reduced, whereby the controllable range of the amount of flash light for closeup photography is greatly extended.

Next, when the camera-to-object distance is longer than a corresponding predetermined distance set by voltage source 75, the output of comparator 76 becomes LOW. As a result, when X contact 34 is closed, the output of AND gate 29 (instead of AND gate 26) becomes HIGH, causing thyristor 6 to be turned on. Thus, the charge stored in main capacitor 5 is discharged through thyristor 6 to flash tube 7 to start flash firing. Subsequently, when the flash light received by photodiode 65 reaches a predetermined amount, the output of switching circuit 74 becomes HIGH, whereby flash firing is stopped. At this time, an excessive amount of ambient light may become larger than that necessary for closeup photography. However, since the overall necessary amount of flash light is also large, no additional problem results. It should be noted also that as flash tube 7 is energized through resistor 38 when photographing an object at a close distance, a loss of energy would occur due to resistor 38. However, the object to be photographed is at a close distance, requiring a small amount of light, thereby resulting in a minimized loss of energy.

Thus, when an object is at a close distance, an accurate flash light controllable range is greatly extended for closeup photography by suppressing the value of current flowing through flash tube 7, and flash photography with correct exposure is possible even for closeups.

It should be understood that in the present embodiment photodiode 65, for determining the selection between the two flash firing modes, is disposed to receive both ambient light and the preparatory flash light with a predetermined durable intensity. Therefore, the output of photodiode 65 does not depend on only the object distance. Namely, when the intensity of the ambient light is stronger, photodiode 65 generates a larger output even if the camera-to-object distance is longer. In this case, however, thyristor 37 is turned on as the amount of flash light required may also be smaller. With the embodiment of FIG. 7, therefore, the amount of required flash light is identified on the basis of both the camera-to-object distance and the intensity of the ambient light for switching between a stronger or weaker flash firing intensity.

Furthermore, it is desirable that the output of switching circuit 74 is connected to a trailing shutter curtain control circuit for controlling the shutter closing operation. Additionally, when the light receiving amount of photodiode 64 reaches a predetermined value corresponding to a correct exposure before X contact 34 is closed and the output of switching circuit 74 is inverted, it is preferable that known electronic flash firing trigger circuit 31 is designed to remain inoperative. Or, alternatively, when the intensity of light received by photodiode 65 with the preparatory durable flash light emitted, is higher than an output of another reference signal source, which generates a specified voltage higher than the output of reference signal source 75, the output resulting from the closing of X contact 34 may be prevented from being transmitted to the electronic flash device.

Furthermore, a light measuring circuit including photodiode 65, voltage source 75, comparator 76, delay circuit 70, which are now located within the camera, and flip-flop 77 may possibly be located within the electronic flash device which is attachable to the camera.

Additionally, although the present embodiment selects the flash modes by identifying whether or not the intensity of the reflected light measured with the preliminary durable light exceeds a specific level, it may also be possible that ordinary flash firing is performed for preliminary flash firing to identify whether the amount of the reflected light integrated during a predetermined period is higher than a specified level. It is to be noted that preliminary flash firing with a durable constant intensity may also be performed for integrated type light measurement.

FIG. 8 illustrates the layout of photodiodes 64 and 65 described in connection with the embodiment of FIG. 7. Shown in FIG. 8 are objective lens L, diaphragm A, mirror 79, print glass 80, pentagonal prism 81, shutter curtain 82 and film 83. When a shutter release button (not shown) is depressed, scene light having passed through objective lens L and diaphragm A is incident upon photodiode 65. Subsequently, when mirror 79 is lifted and shutter curtain 82 travels, scene light having passed through objective lens L and diaphragm A is reflected from film 84 and is then incident upon photodiode 64.

FIG. 9 shows the circuitry of flash light signal source 35, the signal output of which is indicative of the necessary amount of flash light. First, a description is given of the operating principle thereof. Assuming that the amount of flash light from a flash tube 7 is P, a constant determined by the reflector efficiency of a flash device or the like is $\alpha$ ($\alpha<1$), the film speed is S, the object distance is l, the focal length of the objective lens is f, the F-number is F and the effective F-number necessary for closeup photography in particular is Fe, the following relationships exist:

$$\alpha \cdot \sqrt{S \cdot P} = l \cdot Fe \tag{1}$$

$$Fe = \{f/(l-f)+1\} \cdot F \tag{2}$$

Herein, $f/(l-f)$ represents a magnification. In the APEX system, the following relationships exist:

$$S = 2^{Sv} \tag{3}$$

$$F = \sqrt{2^{Av}}$$

Furthermore, when they are defined as follows, $$\sqrt{P} \stackrel{df}{=} 2^k \tag{4}$$

$$l \stackrel{df}{=} 2^{lv}$$

$$f \stackrel{df}{=} 2^{fv}$$

$$\alpha \stackrel{df}{=} 2^{-\beta}$$

the following formula is obtained from equations (1) and (2).

$$k = \tfrac{1}{2} \cdot [2lv + Av + 2 \cdot \text{Log}_2\{2^{lv}/(2^{lv}-2^{fv})\} - Sv + 2\beta] \tag{5}$$

When defined as, $$lv - fv \stackrel{df}{=} \Delta \tag{6}$$

equation (5) is modifiable to obtain the following:

$$k = \tfrac{1}{2} \cdot [2lv + Av + 2 \cdot \text{Log}_2\{2^\Delta/(2^\Delta - 1)\} - Sv + 2\beta] \tag{7}$$

As is apparent from the definition of equations (4), k on the left side corresponds to a logarithmic compression value for the amount of flash light from flash tube 7, such as a Xenon flash tube. Consequently, $\Delta$ is obtained from data lv corresponding to an object distance and data fv corresponding to the lens focal length in accordance with equation (6). Data corresponding to this $\Delta$ is converted into data corresponding to $\text{Log}_2\{2^\Delta/(2^\Delta - 1)\}$, using a data converter (e.g., a decoder or ROM). Then, based on the above data and data lv corresponding to an object distance, as well as data Av corresponding to the diaphragm aperture and data Sv corresponding to film speed, k is calculated in accordance with equation (7); parameter k may be input to an electronic flash device.

The following description concerns the construction and the operation of the circuitry illustrated in FIG. 9. It is to be noted that a signal line with a slash represents plural-bits of a digital signal. Variable resistor $VR_1$, which may be varied in automatic response to the rotation of the distance ring of the lens barrel or to the movement of the bellows, generates signal lv representative of an object distance, and the potential at terminal $J_1$ corresponds to signal lv with a current flowing thereto from constant current source $I_1$ through terminals $J'_1$ and $J_1$. Resistor $R_1$, which may be located within the individual exchangeable lens, generates signal fv corresponding to the focal length of the objective lens. A current flows from constant current source $I_2$ through terminals $J'_2$ and $J_2$ to resistor $R_1$, and the potential at terminal $J_{2'}$ corresponds to signal fv. Furthermore, a potential corresponding to film speed Sv is produced from a circuit comprising variable resistor $VR_2$ and constant current source $I_3$, and a potential corresponding to aperture value Av is produced from a circuit comprising variable resistor $VR_3$ and constant current source $I_4$.

Signals lv and fv are input to subtractor circuit 94 consisting of resistors $R_{12}$, $R_{13}$, $R_{14}$ and $R_{15}$, and operational amplifier $OA_4$ to calculate the following:

$$lv - fv \stackrel{df}{=} \Delta \tag{6}$$

An analog signal corresponding to $\Delta$ from subtractor circuit 94 is converted to a digital signal by A-D converter 95.

TABLE 1

| $\Delta$ | $\text{Log}_2\{2^\Delta/(2^\Delta - 1)\}$ | $\Delta$ | $\text{Log}_2\{2^\Delta/2^\Delta - 1)\}$ |
|---|---|---|---|
| 0.2 | 2.95 | 1.0 | 1.00 |
| 0.3 | 2.41 | 1.3 | 0.75 |
| 0.4 | 2.05 | 1.7 | 0.53 |
| 0.5 | 1.77 | 2.1 | 0.38 |
| 0.6 | 1.56 | 3.0 | 0.19 |
| 0.7 | 1.38 | 4.0 | 0.09 |
| 0.8 | 1.23 | 5.0 | 0.05 |

Subsequently, data from A-D converter 95 and data from fixed data output circuit 96 are compared by comparator 97. As shown in Table 1, the value for equation of $\text{Log}_2 (2^\Delta/2^\Delta - 1)$ is nearly equal to zero for $\Delta \geq 4.0$. This means than an effective F-number and the F-number of an objective lens are equal when $\Delta \geq 4.0$. Thus, fixed data output circuit 96 generates an output corresponding to $\Delta c = 4.0$, and the output from comparator 97 becomes LOW when $\Delta - \Delta c$. Multiplexer 99 transmits data received from A-D converter 95. When the data from multiplexer 99 designates the address of ROM100, for example, data corresponding to $2 \cdot \text{Log}_2 \{2^\Delta/(2^\Delta - 1)\}$ (which is permanently stored in the designated address of ROM100) is generated and converted into an analog signal by D-A converter 101. However, when $\Delta \geq \Delta c$, the output of comparator 97 becomes HIGH and this signal allows decoder 98 to generate data corresponding to the specified address of ROM100 and the data is sent through multiplexer 99 to ROM100. Thus, ROM100 generates data corresponding to zero and this data is converted to an analog signal by D-A converter 101.

A signal corresponding to signal lv from terminal $J_1'$ is input to interting amplifier 91 composed of resistor $R_2$ and $R_3'$ and operational amplifier $OA_1$. And in response thereto, a signal representative of $-2 \cdot lv$ is generated from inverting amplifier 91. This signal from amplifier 91, the signal of film speed Sv from variable resistor $VR_2$, a signal representing F-number Av from variable resistor $VR_3$, signal $2\beta$ from voltage source E and a signal of $2 \cdot Log_2\{2^\Delta/(2^\Delta-1)\}$ from D-A converter 101, are all input to adder-subtractor circuit 92 comprising resistors $R_4$, $R_5$, $R_6$, $R_7$, $R_8$ and $R_9$, and operational amplifier $OA_2$ such that the following calculation is performed:

$$(-2lv)+Sv-Av-2 \cdot Log_2\{2^\Delta/(2^\Delta-1)\}-2\beta=-2k \qquad (8)$$

and a signal corresponding to $-2k$ is generated thereby. The signal is input to inverting amplifier 93 composed of resistors $R_{10}$ and $R_{11}$ and operational amplifier $OA_3$, and circuit 93 generates a signal of $(-\frac{1}{2}) \cdot (-2k) = k$, which is input to an electronic flash control device, such as transistor 16 and comparator 24 of the embodiments of FIGS. 3, 4 and 5, or transistor 57 of the embodiment of FIG. 6.

It is to be noted that a circuit such as is shown in FIGS. 3, 6 and 7 for flash firing with a durable constant intensity, may be designed to directly monitor the current flowing through a flash tube, for example, using a resistor, thereby allowing the monitored output to be sent to the negative input terminal of comparator 23. This enables photodiode 22, diode 20 and operational amplifier 21 to be omitted.

It should also be understood that the object distance information may be obtained from an automatic distance detector measuring device, such as is used in an automatic focus control camera.

The reference voltage sources described herein may comprise actual electrical circuits or simply Zener diodes connected to the camera battery source as is apparent to one of ordinary skill in the camera art. The battery symbols used throughout the description for the various reference voltage sources are for illustrative purposes only. The various embodiments described herein are also usable in conjunction with shutter mechanisms other than those of the travelling curtain type, which have been specifically referred to in the specification, again for the purpose of describing the various embodiments representing the best mode of carrying out the invention.

It is, therefore, desired that the present invention not be limited to the embodiments specifically described herein, but that it include all such modifications and variations that would be obvious to those skilled in the camera art. The scope of our invention should be determined by the equivalents of the various terms as recited in the following annexed claims.

What is claimed is:

1. Photographic system for flash photography, comprising:
   an electronic flash tube;
   means for supplying firing current to said electronic flash tube;
   means for selectively restricting said firing current;
   means for detecting whether or not the flash light amount necessary for a flash photograph is below a predetermined level prior to the firing of said flash tube for photographic exposure;
   means for selecting said restricting means to actually restrict said firing current when said detecting means detects that said necessary flash light amount is below said predetermined level; and
   means for controlling the operation of said flash tube such that the flash light emission therefrom substantially corresponds to said necessary flash light amount.

2. Photographic system as in claim 1 further comprising means for bypassing said restricting means and being responsive to said detecting means detecting that said necessary flash light amount is not below said predetermined level for firing said flash tube with unrestricted firing current.

3. Photographic system as in claim 2, wherein said controlling means includes means connected in the path of said firing current for interrupting the flow thereof.

4. Photographic system as in claim 3, wherein said restricting means includes an impedance device and first means for conducting said firing current through said impedance device, said bypassing means includes second means for conducting said firing current to bypass said impedance device, and said selecting means includes means for selecting between said first and second means in response to said detecting means.

5. Photographic system as in claim 4, wherein said impedance device is a resistor.

6. Photographic system as in claim 3, further comprising means for monitoring the flash emission from said flash tube and emitting a monitoring signal output when said necessary amount of flash light has been emitted and wherein said interrupting means includes means responsive to said monitoring signal output for stopping the flow of said firing current.

7. Photographic system as in claim 2, wherein said restricting means includes means for regulating said firing current so that said flash tube emits durable flash light for a period of time with a substantially constant intensity.

8. Photographic system as in claim 7, wherein said controlling means includes means for setting the intensity of said durable flash light in accordance with said necessary flash light amount with said time period predetermined.

9. Photographic system as in claim 7, wherein said controlling means includes means for setting said time period, in accordance with said necessary flash light amount with said intensity predetermined.

10. Photographic system as in claim 2, wherein said restricting means includes means for selectively reducing the voltage of said means for supplying firing current in response to said necessary flash light amount being below said predetermined level as detected by said detecting means.

11. Photographic system as claimed in claim 2, further comprising means for producing a signal indicative of said necessary flash light amount, said producing means including means for preparatorily projecting artificial light toward the photographic object, and means for measuring light reflected from said object to generate said signal.

12. Photographic system as in claim 11, wherein said producing means further includes means for maintaining said artificial light durable for a period of time with a predetermined constant intensity during said time period, and said light measuring means is responsive to the intensity of said reflected light.

13. Photographic system as claimed in claim 3, further comprising means for measuring the light reflected from the photographic object and generating a signal output with said reflected light substantially equal to a predetermined level, and wherein said interrupting means includes means for stopping the flow of said firing current in response to said signal output.

14. Photographic system as claimed in claim 13, wherein said means for measuring light receives light reflected from the exposed film surface in the camera to generate said signal output.

15. Photographic system as claimed in claim 2, further comprising means for producing a signal indicative of said necessary flash light amount, said producing means including means for calculating said necessary flash light amount in accordance with photographic parameter signals respectively indicative of the object distance, the film speed and the aperture value.

16. Photographic system as claimed in claim 15, wherein said producing means further includes means for generating said photographic parameter signals.

17. Photographic system as claimed in claim 15, wherein said calculating means is responsive to another photographic parameter signal indicative of the focal length of the objective lens.

18. Photographic system as claimed in claim 17, wherein said calculating means further includes means for generating said another photographic parameter.

19. Photographic system for flash photography, comprising:
means for producing a signal indicative of the flash light amount necessary for a photograph and including means for calculating said necessary flash light amount in accordance with information indicative of the object distance, the film speed, the aperture value, and the focal length of the objective lens;
means for generating a flash emission control signal in response to said signal and adapted to control the amount of light emitted from a flash tube; and
means for blocking said information indicative of the focal length from said means for calculating when a ratio of the object distance to the focal length exceeds a predetermined level.

20. Photographic system for flash photography, comprising:
an electronic flash tube;
means for detecting whether the flash light amount necessary for a photograph is lower or higher than a predetermined level prior to the firing of said flash tube for photography;
means for selecting between a first firing mode of said flash tube to produce a higher intensity flash light emission therefrom and a second firing mode of said flash tube with a lower intensity flash light emission therefrom, and said second mode is selected with said detecting means detecting that said necessary flash light amount is lower than said predetermined level; and
means for controlling the excitation of said flash tube such that the flash light emission therefrom substantially corresponds to said necessary flash light amount.

21. Photographic system as in claim 20, wherein said selecting means includes a pair of selectable current paths each having different impedance characteristics to the flow of flash tube firing current therethrough.

22. Photographic system as in claim 20, further comprising a power source for supplying firing current to said flash tube and wherein said selecting means includes means for selectively setting the voltage of said power source between at least a pair of different voltages.

23. Photographic system as in claim 22, further comprising means for monitoring the flash emission from said flash tube and emitting a monitoring signal output when said necessary amount of flash light has been emitted and wherein said controlling means includes means connected in the path of firing current for said flash tube for interrupting the flow of said firing current in response to said monitoring signal output.

* * * * *